(12) United States Patent
Sugiyama et al.

(10) Patent No.: US 9,539,910 B2
(45) Date of Patent: Jan. 10, 2017

(54) ELECTRIC POWER SYSTEM

(75) Inventors: Akinobu Sugiyama, Chiyoda-ku (JP);
Hiroshi Fujioka, Chiyoda-ku (JP);
Takanori Matsunaga, Chiyoda-ku (JP);
Kohei Mori, Chiyoda-ku (JP);
Toshihide Satake, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 1470 days.

(21) Appl. No.: 13/168,469

(22) Filed: Jun. 24, 2011

(65) Prior Publication Data

US 2012/0074777 A1   Mar. 29, 2012

(30) Foreign Application Priority Data

Sep. 24, 2010   (JP) .................................. 2010-213283

(51) Int. Cl.
| | |
|---|---|
| B60L 1/00 | (2006.01) |
| B60L 3/00 | (2006.01) |
| H02G 3/00 | (2006.01) |
| B60L 11/18 | (2006.01) |
| B60L 8/00 | (2006.01) |

(52) U.S. Cl.
CPC ............ B60L 11/1816 (2013.01); B60L 8/003 (2013.01); B60L 8/006 (2013.01); B60L 11/1803 (2013.01);
(Continued)

(58) Field of Classification Search
CPC .... B60R 16/03; B60R 16/0315; B60R 21/017; Y02T 10/7005; H02J 7/1438; H02J 7/00; B60K 16/00; B60K 28/00; B60L 1/00
(Continued)

(56) References Cited

U.S. PATENT DOCUMENTS 5,905,624 A * 5/1999 Andreica .................. B66C 1/08
361/144
8,466,658 B2 * 6/2013 Kajouke ........... H02M 3/33584
320/128
(Continued)

FOREIGN PATENT DOCUMENTS

CN    1018411184 A    9/2010
EP       1089538 A1 *  4/2001   ............ H04M 19/08
(Continued)

OTHER PUBLICATIONS

Japanese Office Action dated Aug. 16, 2012, issued in corresponding Japanese Patent Application No. 2010-213283.
(Continued)

*Primary Examiner* — Rexford Barnie
*Assistant Examiner* — Jagdeep Dhillon
(74) *Attorney, Agent, or Firm* — Sughrue Mion, PLLC; Richard T. Turner

(57) ABSTRACT

An electric power converting apparatus mainly includes a first power supply circuit, a second power supply circuit, a selection circuit, a control circuit, a bi-directional inverter circuit, and a charge/discharge circuit. The control circuit composed of a microcomputer or a microprocessor such as a DSP controls an operation of the electric power converting apparatus. The first power supply circuit or the second power supply circuit supplies a operation voltage for the control circuit. The first power supply circuit generates the operation voltage for the control circuit based on an AC voltage supplied from the electric power supply system. The second power supply circuit generates the operation voltage for the control circuit based on a DC voltage supplied from a DC power supply in an electric vehicle EV.

8 Claims, 6 Drawing Sheets

(52) U.S. Cl.
CPC ......... *B60L 11/1814* (2013.01); *B60L 2210/12* (2013.01); *B60L 2220/54* (2013.01); *Y02T 10/641* (2013.01); *Y02T 10/7005* (2013.01); *Y02T 10/7072* (2013.01); *Y02T 10/7083* (2013.01); *Y02T 10/7233* (2013.01); *Y02T 90/127* (2013.01); *Y02T 90/14* (2013.01); *Y10T 307/336* (2015.04)

(58) Field of Classification Search
USPC ............. 307/10.1, 128, 75, 80, 86; 320/128; 180/2.2, 65.31, 65.265
See application file for complete search history.

(56) References Cited

U.S. PATENT DOCUMENTS

| | | | |
|---|---|---|---|
| 2005/0068002 A1 | 3/2005 | Ozeki | |
| 2009/0236916 A1 | 9/2009 | Nishimura | |
| 2010/0000804 A1* | 1/2010 | Yeh ........................ | B60K 16/00 180/2.2 |
| 2010/0090525 A1* | 4/2010 | King .................. | B60L 11/1868 307/10.1 |

FOREIGN PATENT DOCUMENTS

| | | | | |
|---|---|---|---|---|
| JP | 08-019193 A | | 1/1996 | |
| JP | 2005-078925 A | | 3/2005 | |
| JP | 2008-054473 A | | 3/2008 | |
| JP | 2009131101 A | | 6/2009 | |
| TW | 200943309 A | * | 10/2009 | ............... G11C 7/00 |
| TW | 200943309 A | * | 10/2009 | |

OTHER PUBLICATIONS

Chinese Office Action, First Office Action, issued Oct. 29, 2013, Application No. 2011101984856.

Communication dated Sep. 4, 2014 from the State Intellectual Property Office of the People's Republic of China in counterpart application No. 201110198485.6.

Chinese Office Action; Application No. 2011101984856; Jun. 3, 2014.

* cited by examiner

DC SIDE                                                    AC SIDE (b)

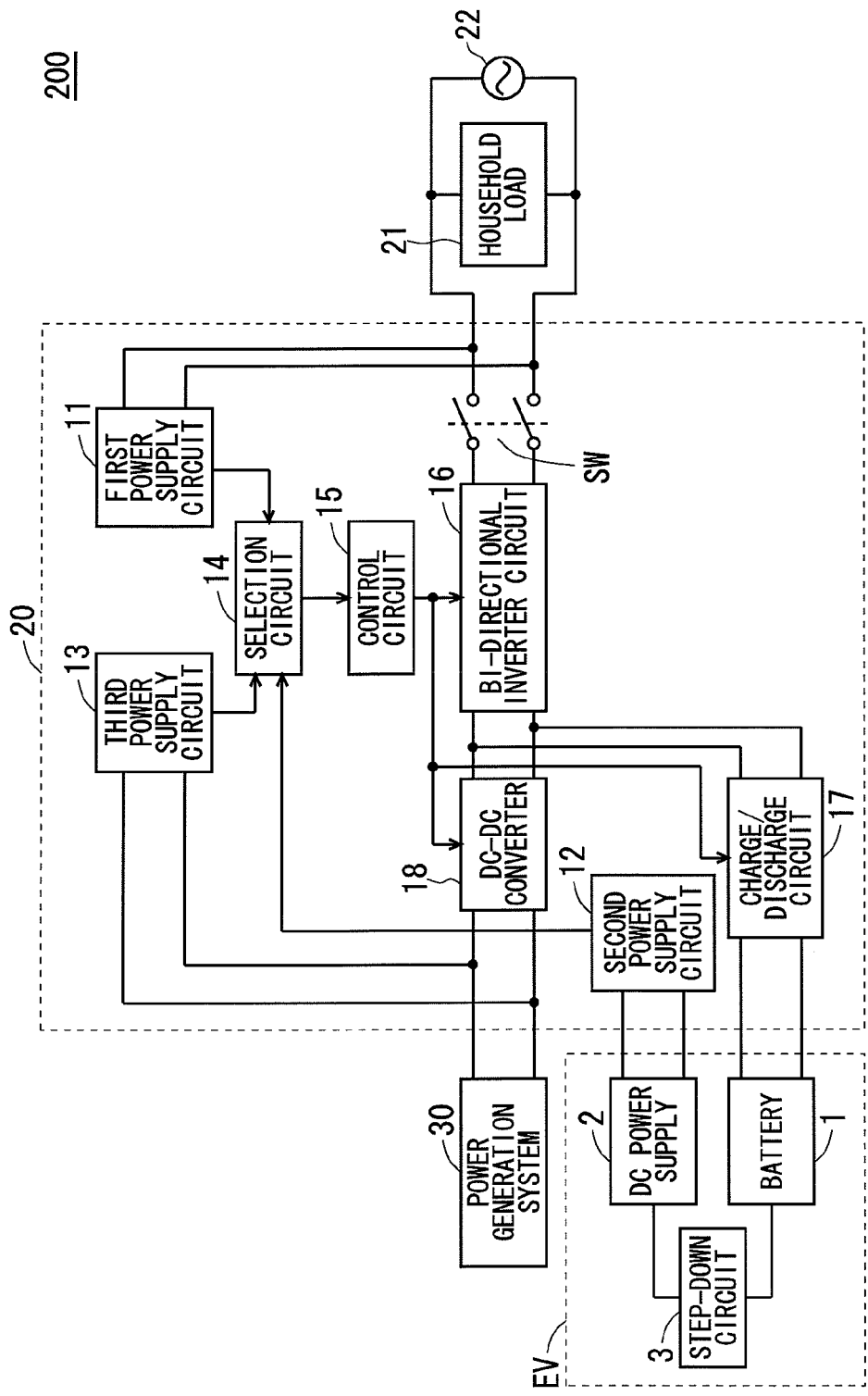
F I G. 5

ELECTRIC POWER SYSTEM

BACKGROUND OF THE INVENTION

Field of the Invention

The present invention relates to an electric power system capable of transmission and reception of electric power to and from an electric vehicle.

Description of the Background Art

Today, in an electric vehicle which uses electric power charged in a battery as a drive source for driving a motor to thereby obtain power, the battery can be charged by a household power supply through a cable. In recent years, more and more homes employ private power generation using photovoltaic power generation or wind power generation. In a case where the homes have any surplus electric power, the surplus electric power is sold to an electric power company, and in a case where the amount of power generation is insufficient, the homes use commercial electric power (system electric power) supplied from an electric power supply system of an electric power company. Advanced version of such a system is a next-generation electric power network called a smart grid.

In the current situation where homes are introducing electric power supply based on private power generation, a battery of an electric vehicle can be charged with electric power obtained by photovoltaic power generation or wind power generation.

A configuration of charging a battery of an electric vehicle with electric power obtained by photovoltaic power generation is disclosed in, for example, Japanese Patent Application Laid-Open No. 1996-19193.

Japanese Patent Application Laid-Open No. 1996-19193 discloses: a household power conditioner for converting DC electric power generated by a solar cell module into AC electric power and supplying the AC electric power to a domestic load; and a system for re-converting AC electric power supplied from the power conditioner into DC electric power and storing the DC electric power in a battery of a gasoline vehicle or an electric vehicle, or converting the stored electric power into AC electric power and supplying the AC electric power to the household load.

Japanese Patent Application Laid-Open No. 1996-19193 does not disclose an internal configuration of the power conditioner, and therefore it is not clear what kind of power supply is used for controlling a control circuit necessary for the DC conversion and the AC conversion in the power conditioner. Japanese Patent Application Laid-Open No. 1996-19193 discloses that in a case where the supply of system electric power is stopped for a long time, a control mode of the power conditioner is switched to a voltage control mode to establish an autonomous operation of the power conditioner. Here, in either of the cases where the power supply to the control circuit in the autonomous operation is obtained from the vehicle battery and obtained from the solar cell module, the need for some voltage step-down means is expected, in order that the power supply to the control circuit which is approximately a few volts can be obtained from a high voltage of 100 volts or more. However, performing a step-down with a large input-output difference causes a problem of an increased switching loss and an increased switching noise.

SUMMARY OF THE INVENTION

An object of the present invention is to provide an electric power system that performs transmission and reception of electric power between an electric vehicle and an electric power supply system, the electric power system being capable of voltage conversion with a reduced switching loss and a reduced switching noise to thereby supply a voltage necessary for a control circuit that controls DC conversion and AC conversion.

In a first aspect of an electric power system according to the present invention, the electric power system for transmission and reception of electric power between an electric power supply system that supplies AC electric power to a load and a vehicle that travels by means of a motor being driven by using electric power charged in a battery as a drive source. The electric power system includes an electric power converting apparatus connected between the electric power supply system and the battery of the vehicle. The electric power converting apparatus includes: a charge/discharge circuit for charging/discharging the battery; a bi-directional inverter circuit connected between the charge/discharge circuit and the electric power supply system, for bi-directional conversion between DC electric power and AC electric power; and a control circuit for controlling the charge/discharge circuit and the bi-directional inverter circuit. The control circuit selects either one of a first voltage and a second voltage as an operation voltage, the first voltage being based on an AC voltage supplied from the electric power supply system, the second voltage being based on a DC voltage supplied from a DC power supply of the vehicle.

In the first aspect, the second voltage based on the DC voltage supplied from the DC power supply in the vehicle can be selected as the operation voltage for the control circuit. This requires a step-down process with merely a small input-output difference, thus allowing a voltage conversion with a small switching loss and a small switching noise. Therefore, the electric power consumption can be suppressed, and a stable voltage can be generated.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing a configuration of an electric power system according to a preferred embodiment 1 of the present invention;

FIG. 5 is a block diagram showing a configuration of an electric power system according to a preferred embodiment 2 of the present invention;

EMBODIMENT FOR CARRYING OUT THE INVENTION

Preferred Embodiment 1

Figure 1:
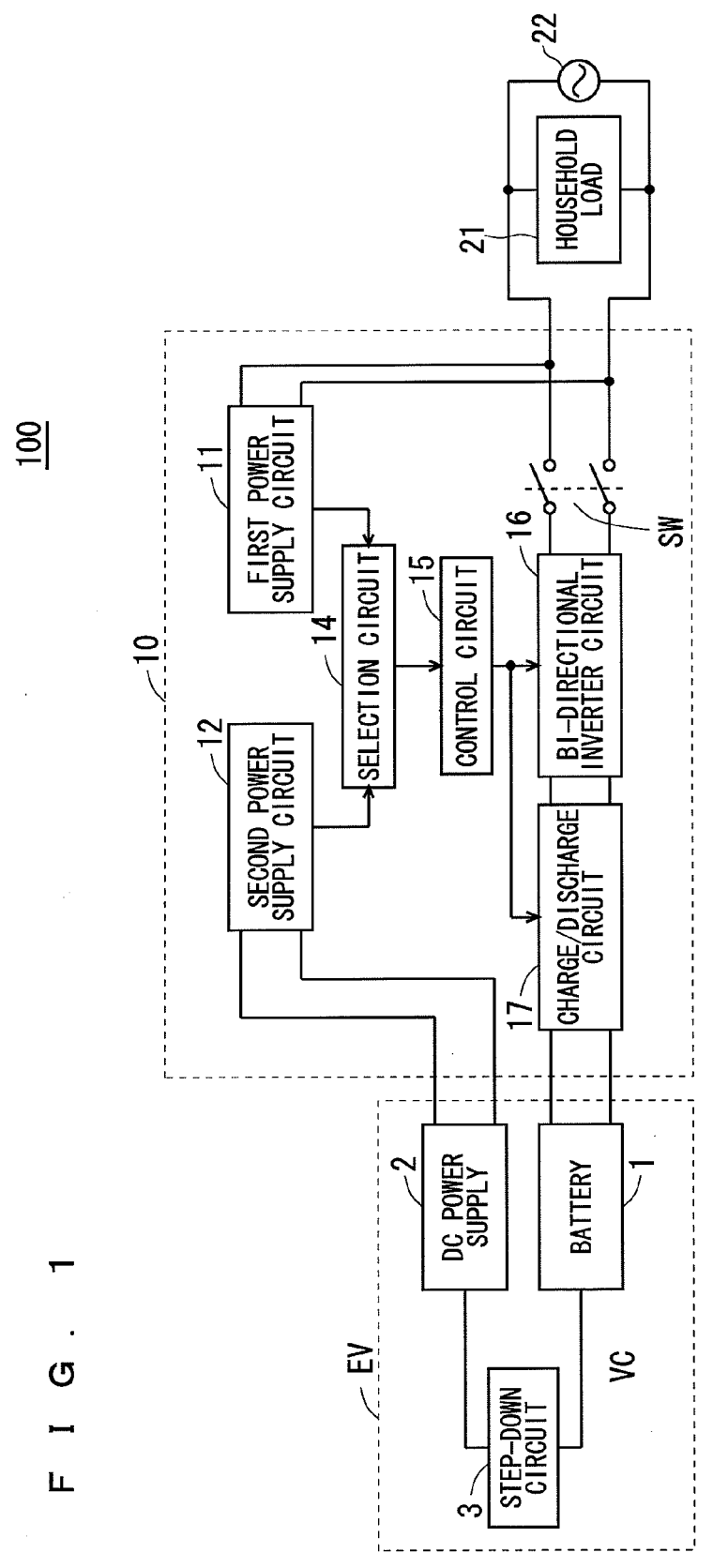
Figure 2:
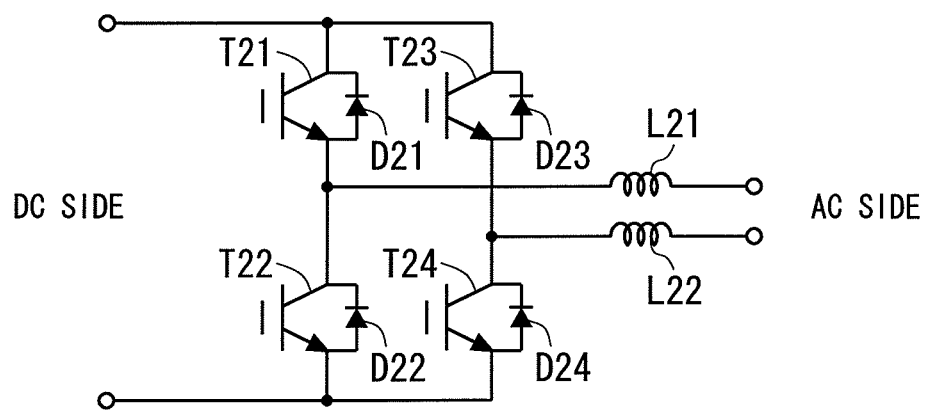
FIG. 2 is a diagram for explaining a configuration and an operation of a bi-directional inverter circuit.
Figure 2:
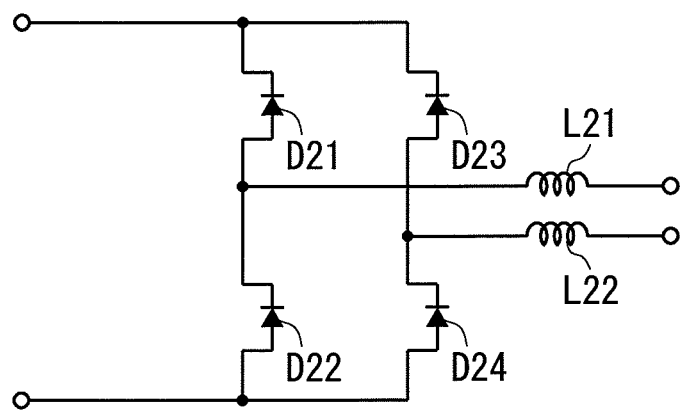

FIG. 1 is a block diagram showing a configuration of a backup system 100 for system electric power that is domestically supplied, as an electric power system according to a preferred embodiment 1 of the present invention.

In a configuration of the backup system 100 shown in FIG. 1, a battery 1 serving as a drive source of a motor (not shown) for travel of an electric vehicle (including a plug-in hybrid vehicle which uses both of a gasoline engine and a motor) EV is used as a backup power supply for system electric power, and electric power can be supplied from the battery 1 to a household load 21 via an electric power converting apparatus 10.

The electric power converting apparatus 10 is a bi-directional electric power converting apparatus that converts AC electric power of 100 to 200 volts supplied from an electric power supply system 22 via a switch SW into DC electric power and stores the DC electric power in the battery 1, and also converts DC electric power stored in the battery 1 into AC electric power of 100 to 200 volts (this voltage depends on the country or region) and supplies the AC electric power to the household load 21 via the switch SW.

The electric power converting apparatus 10 includes, as main components, a first power supply circuit 11, a second power supply circuit 12, a selection circuit 14, a control circuit 15, a bi-directional inverter circuit 16, and a charge/discharge circuit 17.

An operation of the electric power converting apparatus 10 is controlled by a control circuit 15 including a microcomputer and a microprocessor such as a DSP (Digital signal Processor). An operation voltage for the control circuit 15 is supplied by the first power supply circuit 11 or the second power supply circuit 12. The first power supply circuit 11 generates the operation voltage for the control circuit 15 based on the AC voltage supplied from the electric power supply system 22. The second power supply circuit 12 generates the operation voltage for the control circuit 15 based on the DC voltage supplied from a DC power supply 2 in the electric vehicle EV.

The DC power supply 2 is a battery that generates a voltage of approximately 12 volts used in a control system of the electric vehicle EV. An output voltage of the battery 1 which is approximately 300 volts is lowered to approximately 12 volts by a step-down circuit 3, and thereby electric power is stored. A DC-DC converter which will be described later is adoptable as the step-down circuit 3. In a possible configuration, the step-down circuit 3 may serve as the DC power supply 2, without using a battery of 12 volts.

In this manner, if the battery and the step-down circuit 3 used in the control system of the electric vehicle EV is used as the DC power supply 2, a voltage given to the second power supply circuit 12 can be lowered, so that the second power supply circuit 12 can be configured as a step-down circuit having a small input-output difference.

The operation voltages of approximately 5 volts for the control circuit 15, which are generated by the first power supply circuit 11 and the second power supply circuit 12, are given to the selection circuit 14, and either one of them is selected and supplied to the control circuit 15. The selection circuit 14 performs the selection such that the operation voltage given from the first power supply circuit 11 is selected in a case where electric power is supplied from the electric power supply system 22 while the operation voltage given from the second power supply circuit 12 is selected in a case where the electric power supply from the electric power supply system 22 is stopped.

The selection circuit 14 may performs the selection based on switching means. A mechanical relay or a MOSFET (Metal-Oxide-Semiconductor Field-Effect-Transistor) may be used as the switching means, and an ON/OFF command thereof may be given from the control circuit 15.

The control circuit 15 controls ON/OFF of the bi-directional inverter circuit 16, the charge/discharge circuit 17, and the like. These fundamental switching operations are controlled by a sub-control circuit (not shown).

As shown in a part (a) of FIG. 2, the bi-directional inverter circuit 16 may be configured as a full-bridge circuit including four switching elements T21, T22, T23, and T24. The switching elements T21 to T24 are connected back-to-back with diodes D21, D22, D23, and D24, respectively.

A MOSFET or an IGBT (Insulated Gate Bipolar Transistor) is used for each of the switching element, and the switching elements are driven by PWM. An output waveform of the full-bridge circuit is smoothed by reactors L21 and L22, and outputted substantially in the formed of a sine wave.

In a case where an electric power supply system is connected to the AC side of the bi-directional inverter circuit 16, an output voltage of the bi-directional inverter circuit 16 is determined by a voltage of the electric power supply system 22, and the bi-directional inverter circuit 16 works as a current-source inverter whose output current is controlled such that the DC-side voltage can be constant.

In a case where an electric power supply system is not connected to the AC side and only an AC load such as the household load 21 is connected thereto, the bi-directional inverter circuit 16 works as a voltage-source inverter controlled such that an output voltage of the inverter circuit can be constant and the DC-side voltage can be constant.

MOSFETs or IGBTs are used for the switching elements of the bi-directional inverter circuit 16. Therefore, when all of the switching elements are always in an OFF state, the full-bridge circuit works as a diode bridge as shown in a part (b) of FIG. 2. Thus, an operation of AC-DC conversion from the electric power supply system 22 side to the input side can be performed.

The charge/discharge circuit 17 is a bi-directional DC-DC converter that steps up the DC output voltage of the battery 1 of approximately 300 volts, up to about 350 volts. For example, a bi-directional chopper shown in FIG. 3 is adoptable as the bi-directional DC-DC converter.

Figure 3:
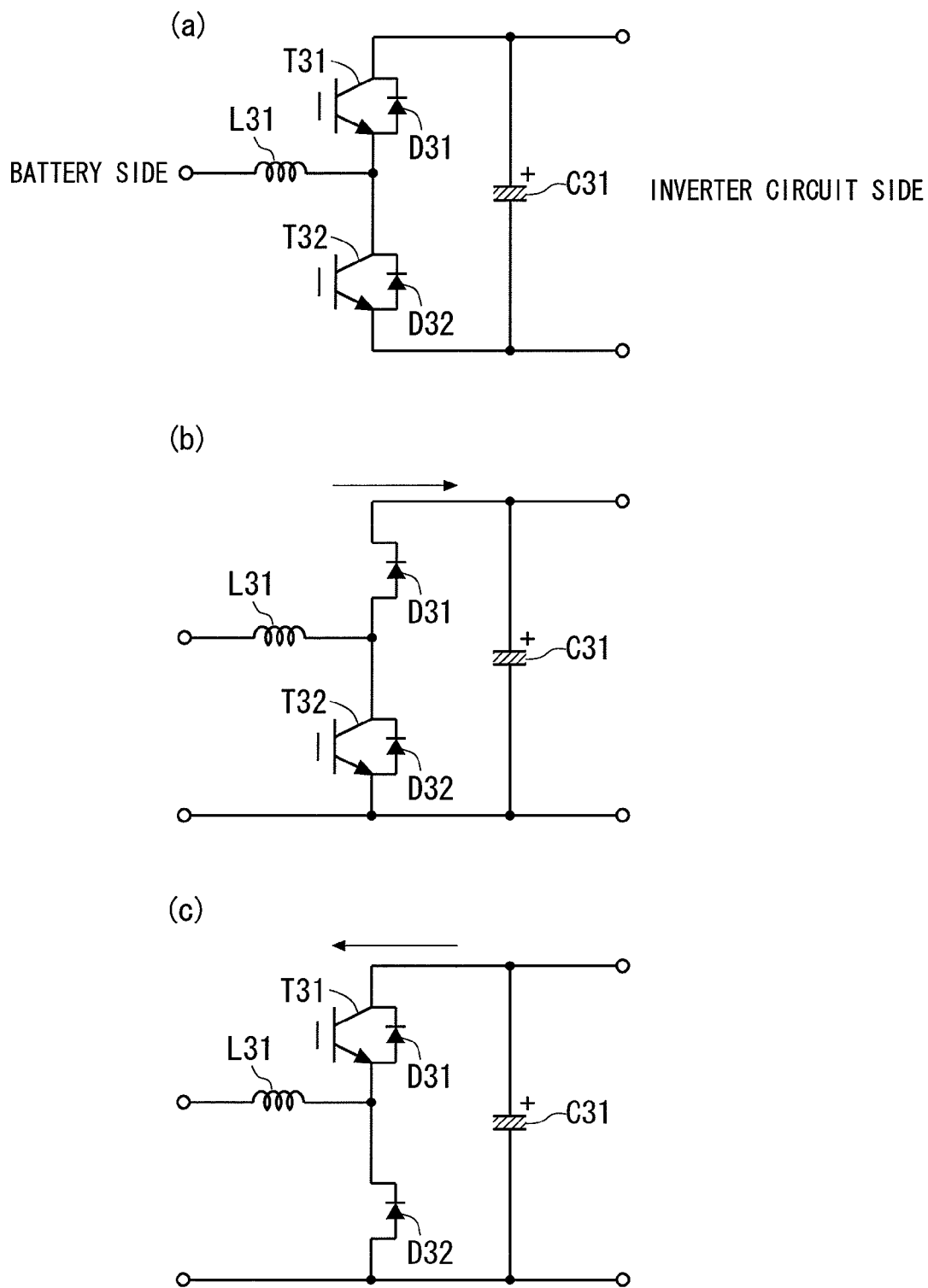
FIG. 3 is a diagram for explaining a configuration and an operation of a charge/discharge circuit.

A part (a) of FIG. 3 shows a circuit diagram, a part (b) of FIG. 3 shows the circuit during a discharging operation, and a part (c) of FIG. 3 shows the circuit during a charging operation.

As shown in the part (a) of FIG. 3, the bi-directional chopper includes switching elements T31 and T32 connected in series with each other, and diodes D31 and D32 connected back-to-back with the switching elements T31 and T32, respectively. The battery 1 is connected, via an impedance element L31, to a connection point between the switching elements T31 and T32. A capacitor C31 is interposed between both ends of the switching elements T31 and T32, so that the bi-directional inverter circuit 16 is connected thereto.

In the discharging operation, as shown in the part (b) of FIG. 3, the switching element T31 is always OFF, and the switching element T32 is driven by PWM (pulse-width modulation), so that the bi-directional chopper operates as a step-up chopper. As a result of this operation, a DC voltage obtained at the output side (inverter circuit side) is higher than that at the input side (battery side).

In the charging operation, as shown in FIG. 3C, the switching element T32 is always OFF, and the switching element T31 is driven by PWM, so that the bi-directional chopper operates as a step-down chopper that performs an operation of step-down from the inverter circuit side toward the battery 1 side.

Here, MOSFETs or IGBTs are used for the switching elements T31 and T32. Therefore, in a case where the switching element is always OFF, the diodes D31 and D32 function, and the switching elements T31 and T32 are always in the OFF state.

In the electric power converting apparatus 10, the operation voltage of approximately 5 volts for the control circuit 15 that controls the bi-directional inverter circuit 16 and the charge/discharge circuit 17 is generated by using the first power supply circuit 11 and the second power supply circuit 12, of which the second power supply circuit 12 can be configured as a step-down circuit having a small input-output difference because the second power supply circuit 12 generates the operation voltage for the control circuit 15 based on the DC voltage supplied from the DC power supply 2 in the electric vehicle EV. This allows a voltage conversion with a small switching loss and a small switching noise. Thus, electric power consumption can be suppressed, and a stable voltage can be generated.

<Modification>

Figure 4:
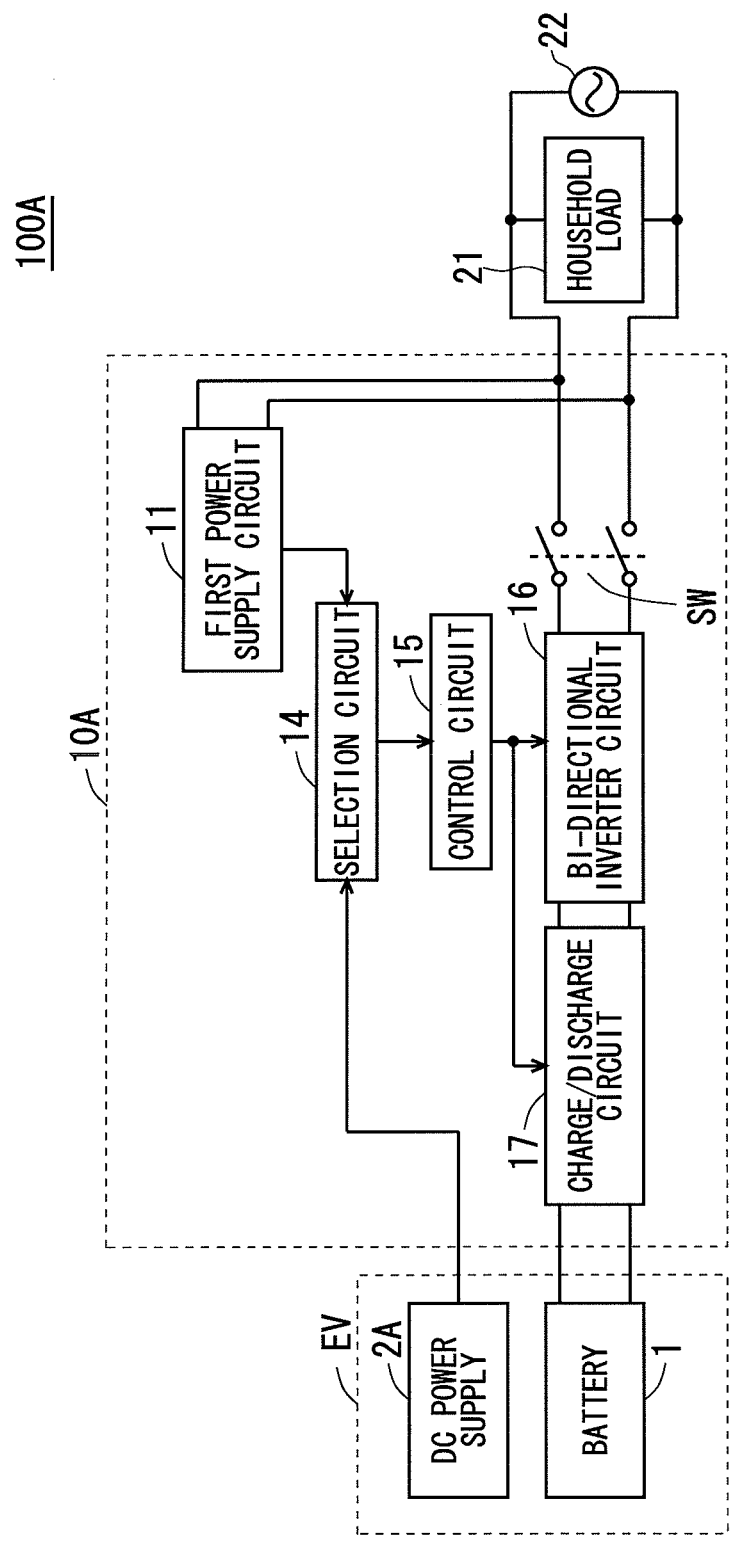
FIG. 4 is a block diagram showing a configuration of an electric power system according to a modification of the preferred embodiment 1 of the present invention.

FIG. 4 is a block diagram showing a configuration of a backup system 100A for system electric power according to a modification of the preferred embodiment 1. The same parts of the configuration as those of the backup system 100 shown in FIG. 1 are denoted by the common corresponding reference numerals, and repetition of the description is omitted.

In the configuration of the backup system 100A shown in FIG. 4, an output voltage of approximately 5 volts from a DC power supply 2A in an electronic control unit (ECU) for controlling the whole of the electric vehicle EV is used as an operation voltage for the control circuit 15. The output voltage outputted from the DC power supply 2A is directly given to the selection circuit 14 of an electric power converting apparatus 10A. Therefore, the second power supply circuit 12 of the electric power converting apparatus 10 shown in FIG. 1 is not necessary, and the configuration of the apparatus can be simplified.

A DC power supply having an output voltage of approximately 5 volts, which serves as an operation voltage for a microcomputer and a microprocessor such as a DSP, is provided within the ECU of the electric vehicle EV. This DC power supply is used as the DC power supply 2A.

The backup system 100A is particularly effective in a case where an operation voltage for the ECU is equal to the operation voltage for the control circuit 15 in the electric power converting apparatus. If there is some difference between the operation voltages for the ECU and the control circuit 15, it can be handled by performing step-down or step-up using the second power supply circuit 12 shown in the description of the electric power converting apparatus 10. In this case, the input-output difference decreases, to allow a voltage conversion with a small switching loss and a small switching noise. Thus, the electric power consumption can be suppressed, and a stable voltage can be generated.

Preferred Embodiment 2

FIG. 5 is a block diagram showing a configuration of a backup system 200 for system electric power, illustrated as an electric power system according to a preferred embodiment 2 of the present invention. The backup system 200 includes a power conditioner 20 that converts AC or DC electric power generated by a solar cell, a fuel cell, wind power generation, or the like, into AC electric power of a commercial frequency, and supplying the AC electric power to an electric power supply system and a household load. The same parts of the configuration as those of the backup system 100 shown in FIG. 1 are denoted by the common corresponding reference numerals, and repetition of the description is omitted.

In the configuration of the backup system 200 shown in FIG. 5, the battery 1 serving as a drive source of a motor (not shown) for travel of the electric vehicle EV can be used as a backup power supply for system electric power, and additionally DC electric power generated in a power generation system 30 can be converted into AC electric power of 100 to 200 volts through a DC-DC converter 18 and the bi-directional inverter circuit 16 and then supplied to the household load 21 via the switch SW.

An output of the DC-DC converter 18 can be charged in the battery 1 via the charge/discharge circuit 17.

In the AC electric power outputted via the switch SW, surplus electric power not consumed in the household load 21 forms a reverse power flow toward the electric power supply system 22 side. Since a mechanism of the reverse power flow is poorly related to the present application, a description thereof is omitted.

The power generation system 30 includes photovoltaic power generation, wind power generation, a fuel cell, or the like. In this preferred embodiment, the photovoltaic power generation is adopted.

In the power conditioner 20, the operation voltage for the control circuit 15 is supplied by the first power supply circuit 11, the second power supply circuit 12, and a third power supply circuit 13. The first power supply circuit 11 generates the operation voltage for the control circuit 15 based on the AC voltage supplied from the electric power supply system 22. The second power supply circuit 12 generates the operation voltage for the control circuit 15 based on the DC voltage supplied from the DC power supply 2 in the electric vehicle EV. The third power supply circuit 13 generates the operation voltage for the control circuit 15 based on an output voltage of 100 to 300 volts from the power generation system 30.

The operation voltages of approximately 5 volts for the control circuit 15, which are generated by the first power supply circuit 11, the second power supply circuit 12, and the third power supply circuit 13, are given to the selection circuit 14, and any one of them is selected and supplied to the control circuit 15.

The selection circuit 14 performs the selection such that the operation voltage given from the first power supply circuit 11 is selected in a case where electric power is supplied from the electric power supply system 22 while the operation voltage given from the second power supply circuit 12 is selected in a case where the electric power supply from the electric power supply system 22 is stopped. In a case where electric power is supplied from the power generation system 30, the selection circuit 14 always selects the operation voltage given from the third power supply circuit.

The control circuit 15 controls ON/OFF of the bi-directional inverter circuit 16, the charge/discharge circuit 17, the DC-DC converter 18, and the like. These fundamental switching operations are controlled by a sub-control circuit (not shown).

The DC-DC converter 18 is a voltage conversion circuit that steps up the DC output voltage of power generation system 30 of 100 to 300 volts, up to about 350 volts. For example, a known circuit such as a step-up chopper shown in FIG. 6 is adoptable to configure the DC-DC converter 18.

Figure 6:
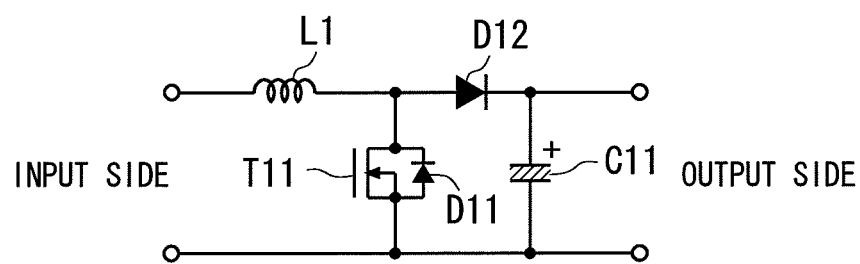
FIG. 6 is a diagram for explaining a configuration of a DC-DC converter.

The step-up chopper shown in FIG. 6 includes a switching element T11 connected between two electric power lines; a capacitor C11 provided between the two electric power lines at the output side of the switching element T11 and connected in parallel with the switching element T11; a diode D12 interposed in the electric power line such that its cathode is connected to a connection point of an electrode of the capacitor C11 at the positive potential side and its anode is connected to a connection point of the switching element T11; an impedance element L1 interposed at a portion of the electric power line between an input end of the connection point of the switching element T11; and a diode D11 connect back-to-back with the switching element T11.

In this configuration, when the switching element T11 is driven by PWM, a DC voltage higher than that of the input side can be obtained.

In the power conditioner 20, the operation voltages of approximately 5 volts for control circuit 15 for controlling the bi-directional inverter circuit 16, the charge/discharge circuit 17, and the DC-DC converter 18 are generated by using the first power supply circuit 11, the second power supply circuit 12, and the third power supply circuit, among which the second power supply circuit 12 can be configured as a step-down circuit having a small input-output difference because the second power supply circuit 12 generates the operation voltage for the control circuit 15 based on the DC voltage supplied from the DC power supply 2 in the electric vehicle EV. This allows a voltage conversion with a small switching loss and a small switching noise. Thus, electric power consumption can be suppressed, and a stable voltage can be generated.

Needless to say, similarly to the backup system 100A for the system electric power shown in FIG. 4, instead of the DC power supply 2 in the electric vehicle EV, an output voltage of approximately 5 volts from a DC power supply serving as a drive power supply of the microcomputer and the microprocessor such as the DSP in the ECU may be used as the operation voltage for the control circuit 15 to thereby omit the need of the second power supply circuit 12.

In the backup systems 100 for system electric power according to the preferred embodiments 1 and 2 described above, a cable for connecting the charge/discharge circuit 17 to the battery 1 and a cable for connecting the second power supply circuit 12 to the DC power supply 2 are necessary between the electric vehicle EV and the electric power converting apparatus 10, the power conditioner 20. Separately preparing these cables makes a connection operation troublesome. Therefore, bundling these cables into a single cable so that they can be inserted and removed at one time provides a user-friendly configuration.

Figure 7:
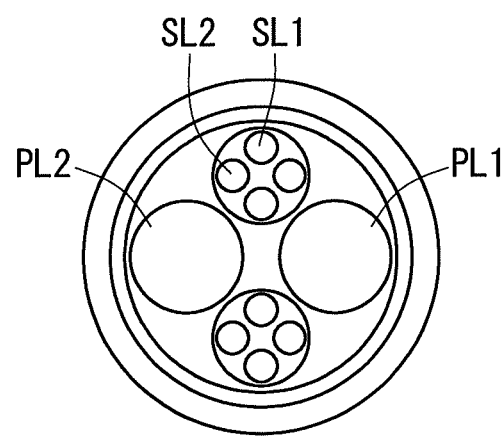
FIG. 7 is a cross-sectional view of a special cable in which a plurality of cables are bundled into a single cable.

FIG. 7 is a cross-sectional view of a special cable in which a plurality of cables are bundled into a single cable. The cable for connecting the charge/discharge circuit 17 to the battery 1 is configured by using thick electric power lines PL1 and PL2, in order that a large amount of electric power can be charged and discharged. The cable for connecting the second power supply circuit 12 to the DC power supply 2 is configured by using signal lines SL1 and SL2, because the amount of electric power is small.

Each of the signal lines SL1 and SL2 is included in different bundles of signal lines. A configuration for bundling a plurality of cables into a single cable is not limited thereto.

Although the operation voltage for the control circuit 15 is approximately 5 volts in the above description, a circuit having an operation voltage of 3.3 volt is sometimes used for the purpose of electric power saving.

While the invention has been shown and described in detail, the foregoing description is in all aspects illustrative and not restrictive. It is therefore understood that numerous modifications and variations can be devised without departing from the scope of the invention.

What is claimed is:

1. An electric power system for transmission and reception of electric power between an electric power supply system that supplies AC electric power to a load and a vehicle that travels by means of a motor being driven by using electric power charged in a first battery as a drive source,
    said electric power system comprising an electric power converting apparatus connected between said electric power supply system and the first battery of said vehicle,
    said electric power converting apparatus including:
        a charge/discharge circuit for charging/discharging said battery;
        a bi-directional inverter circuit connected between said charge/discharge circuit and said electric power supply system, for bi-directional conversion between DC electric power and AC electric power; and
        a control circuit for controlling said charge/discharge circuit and said bi-directional inverter circuit,
    said control circuit selects either one of a first voltage and a second voltage as an operation voltage for the control circuit, said first voltage being based on an AC voltage supplied from said electric power supply system, said second voltage being based on a DC voltage supplied from a DC power supply of said vehicle.

2. The electric power system according to claim 1, wherein
    said electric power converting apparatus includes a power supply circuit for stepping-down said DC voltage supplied from said DC power supply to generate said second voltage.

3. The electric power system according to claim 2, wherein
    said DC power supply is configured as a second battery for power supply to a control system of said vehicle.

4. The electric power system according to claim 1, wherein
    said electric power converting apparatus uses said DC voltage supplied from said DC power supply as said second voltage.

5. The electric power system according to claim 4, wherein
    said DC power supply is configured as a power supply circuit for driving a processing unit of an electronic control unit that controls the whole of said vehicle.

6. The electric power system according to claim 1, wherein
    said electric power system further comprises a power generation system for generating DC electric power,
    said electric power converting apparatus is configured to convert DC electric power generated in said power generation system into AC electric power through said bi-directional inverter circuit and supply said AC electric power to said load, and also to charge said first battery via said charge/discharge circuit, and
    said electric power converting apparatus selects any one of said first voltage, said second voltage, and a third voltage as an operation voltage for said control circuit, said third voltage being based on DC voltage supplied from said power generation system.

7. The electric power system according to claim 1, wherein
said first battery and said DC power supply of said vehicle are connected to said electric power converting apparatus via a special cable in which a cable for connection with said first battery and a cable for connection with said DC power supply are bundled into a single cable.

8. The electric power system according to claim 2, wherein said DC power supply is configured as a step-down circuit for stepping down an output voltage of said first battery that drives said motor.

\* \* \* \* \*